(12) United States Patent
Chang

(10) Patent No.: US 9,155,368 B2
(45) Date of Patent: Oct. 13, 2015

(54) WATERPROOF PROTECTION POUCH FOR MOBILE DEVICES

(71) Applicant: Chi-Yuan Chang, Taichung (TW)

(72) Inventor: Chi-Yuan Chang, Taichung (TW)

( * ) Notice: Subject to any disclaimer, the term of this patent is extended or adjusted under 35 U.S.C. 154(b) by 156 days.

(21) Appl. No.: 14/146,221

(22) Filed: Jan. 2, 2014

(65) Prior Publication Data

US 2015/0181996 A1    Jul. 2, 2015

(51) Int. Cl.
| | |
|---|---|
| A45C 11/22 | (2006.01) |
| B65D 81/22 | (2006.01) |
| B65D 6/00 | (2006.01) |
| B65D 81/18 | (2006.01) |
| A45C 11/00 | (2006.01) |

(52) U.S. Cl.
CPC .............. *A45C 11/22* (2013.01); *B65D 11/20* (2013.01); *B65D 81/18* (2013.01); *A45C 2011/002* (2013.01); *A45C 2011/003* (2013.01); *A45F 2200/0508* (2013.01); *A45F 2200/0516* (2013.01); *A45F 2200/0525* (2013.01); *A45F 2200/0533* (2013.01)

(58) Field of Classification Search
None
See application file for complete search history.

(56) References Cited

U.S. PATENT DOCUMENTS

| | | | |
|---|---|---|---|
| 4,232,808 A * | 11/1980 | Gray | 224/610 |
| 6,056,174 A * | 5/2000 | Minckler | 224/250 |
| 6,273,252 B1 * | 8/2001 | Mitchell | 206/320 |
| 7,891,220 B2 * | 2/2011 | Yen et al. | 70/63 |
| 8,446,711 B2 * | 5/2013 | Liao et al. | 361/679.01 |
| 8,922,506 B2 * | 12/2014 | Jung et al. | 345/173 |
| 8,958,857 B1 * | 2/2015 | Kennard et al. | 455/575.8 |
| 2009/0302799 A1 * | 12/2009 | Marquet et al. | 320/101 |
| 2012/0028691 A1 * | 2/2012 | Koehl | 455/575.1 |
| 2012/0138490 A1 * | 6/2012 | Hollander et al. | 206/205 |
| 2013/0027849 A1 * | 1/2013 | Berumen | 361/679.01 |
| 2013/0126533 A1 * | 5/2013 | Klosky | 220/560 |
| 2013/0206614 A1 * | 8/2013 | O'Neill et al. | 206/216 |
| 2013/0334071 A1 * | 12/2013 | Carnevali | 206/37 |
| 2014/0346078 A1 * | 11/2014 | Chang | 206/521 |
| 2014/0353179 A1 * | 12/2014 | Kim | 206/37 |
| 2014/0364177 A1 * | 12/2014 | Johnson et al. | 455/575.8 |
| 2015/0037618 A1 * | 2/2015 | Kim | 429/7 |
| 2015/0143648 A1 * | 5/2015 | Batey | 15/104.93 |
| 2015/0155902 A1 * | 6/2015 | Lin et al. | 455/575.8 |

* cited by examiner

*Primary Examiner* — Gary Elkins
(74) *Attorney, Agent, or Firm* — Muncy, Geissler, Olds & Lowe, P.C.

(57) ABSTRACT

A waterproof protection pouch for mobile devices comprises a coupling set, a pouch, a sealing member and a retrieval tray. The coupling set includes a rigid ring, an opening and a clamping ring. The rigid ring has an annular latch groove on the outer circumference thereof. The pouch includes a connecting portion connected to the coupling set and a pouch opening. The sealing member includes a cap, a latch portion latched on the latch groove and a plug to wedge in the opening. The plug includes at least one annular sealing ridge on the outer circumference thereof. The retrieval tray has a carrying plate to hold the mobile device and a retrieval portion running through the pouch opening and opening of the coupling set to connect to the sealing member. Through the rigid ring and sealing member, the waterproof protection pouch can provide watertight and pressure withstanding effects.

9 Claims, 6 Drawing Sheets

WATERPROOF PROTECTION POUCH FOR MOBILE DEVICES

FIELD OF THE INVENTION

The present invention relates to a protection pouch for communication devices and particularly to a waterproof protection pouch for mobile devices.

BACKGROUND OF THE INVENTION

Advance of technology has made mobile devices such as digital cameras, cellular phones or tablet computers indispensible for many people in the modern world. Now the smartphones further integrate a lot of functions such as communication, entertainment, event record and the like, and thus the importance of mobile devices to modern people is raised to a higher level.

To improve the service life and durability of the smartphones in severe environments, many types of cellular phone protection pouches have been introduced on the market. The most common ones are protective leather pouches or backside protective pouches. They merely provide basic protection of crashproof or pressure-withstanding, but no waterproof function. In the event that a cellular phone drops into water, they do not provide necessary protection and often result in damage of the cellular phone.

To achieve waterproof effect, waterproof protection pouches for cellular phones also have been developed on the market. Please refer to FIG. 1 for a conventional waterproof pouch for cellular phones. It includes a pouch 1 to hold a cellular phone and a sealing member 2 connected to the pouch 1. The sealing member 2 has two latch sets 3 that can be coupled together to close the opening of the pouch 1 to meet waterproof purpose.

While the aforesaid conventional waterproof pouch for cellular phones can provide waterproof effect, it does not offer crashproof and pressure-withstanding functions. Moreover, to meet the waterproof purpose, the conventional cellular phone waterproof pouch also has limitation on the size of the pouch opening. This impairs usability.

SUMMARY OF THE INVENTION

The primary object of the present invention is to enhance protection efficacy of protection pouch for mobile devices.

Another object of the invention is to improve usability of protection pouch for mobile devices.

To achieve the foregoing objects, the present invention provides a waterproof protection pouch for mobile devices. The waterproof protection pouch comprises a coupling set, a pouch, a sealing member and a retrieval tray. The coupling set includes a rigid ring, an opening running through the rigid ring and a clamping ring wedged in the rigid ring. The rigid ring has an annular latch groove formed on the outer circumference. The pouch includes a connecting portion connected to the coupling set, a pouch opening formed in the connecting portion and a transparent viewing section. The connecting portion is sandwiched between the rigid ring and clamping ring. The sealing member includes a cap, a latch portion extended from the circumference of the cap towards the coupling set to latch on the latch groove, and a plug to wedge in the opening for closing thereof. The plug includes at least one annular sealing ridge on the circumference thereof. The retrieval tray is located in the pouch and has a carrying plate to hold the mobile device and a retrieval portion running through the pouch opening and opening of the coupling set to connect to the sealing member.

By means of the structure set forth above, the invention provides features as follows:

1. Through the coupling set and sealing member, the waterproof protection pouch can provide watertight effect.
2. Through the rigid ring, the waterproof protection pouch can withstand external pressure or impact when falling down to achieve crashproof and pressure-withstanding effects.
3. Since the retrieval portion is connected to the sealing member, when the sealing member is removed from the coupling set, the retrieval tray together with the mobile device also are pulled out, and thus can improve usability.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
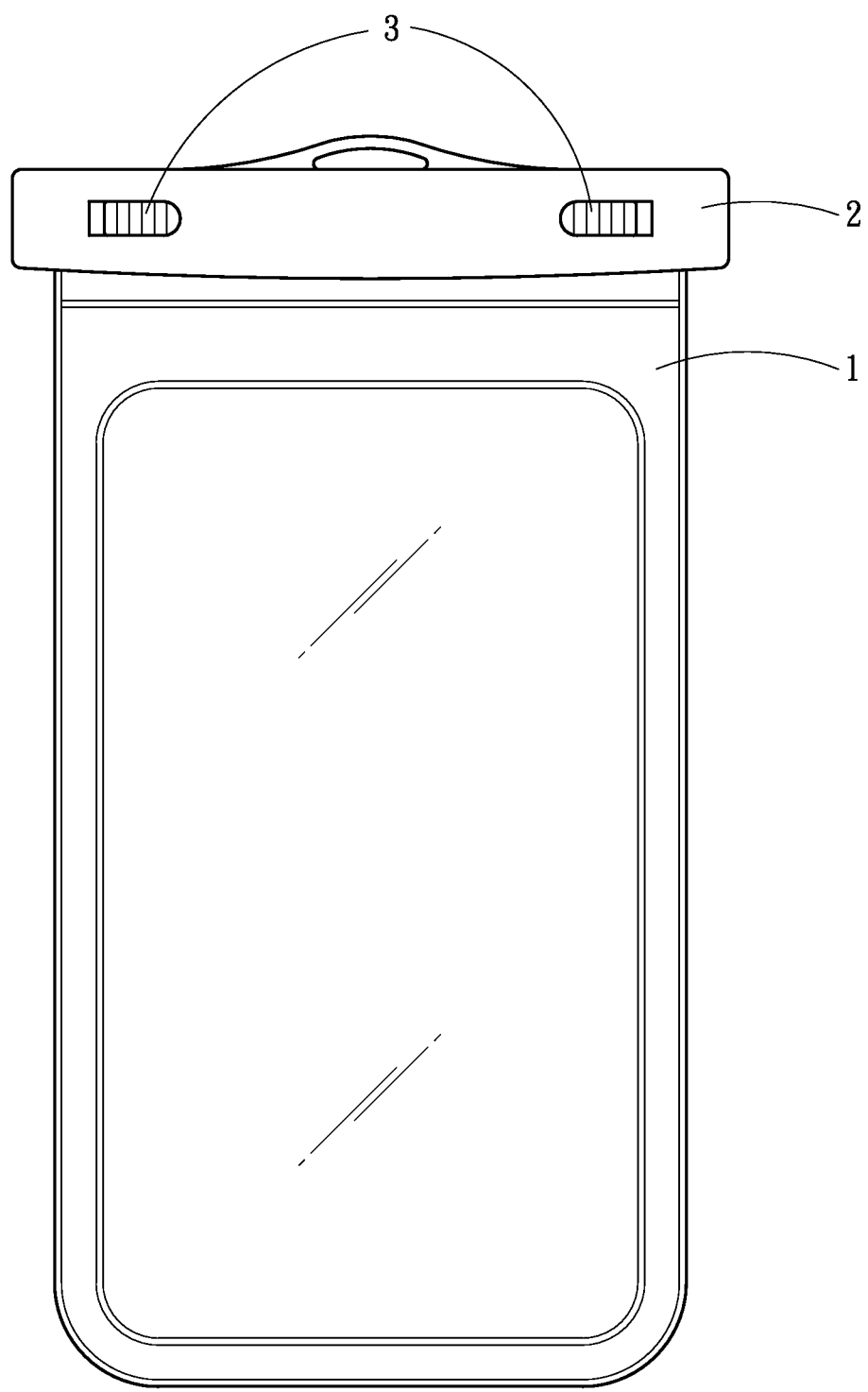
FIG. 1 is a schematic view of a conventional waterproof protection pouch.
Figure 2:
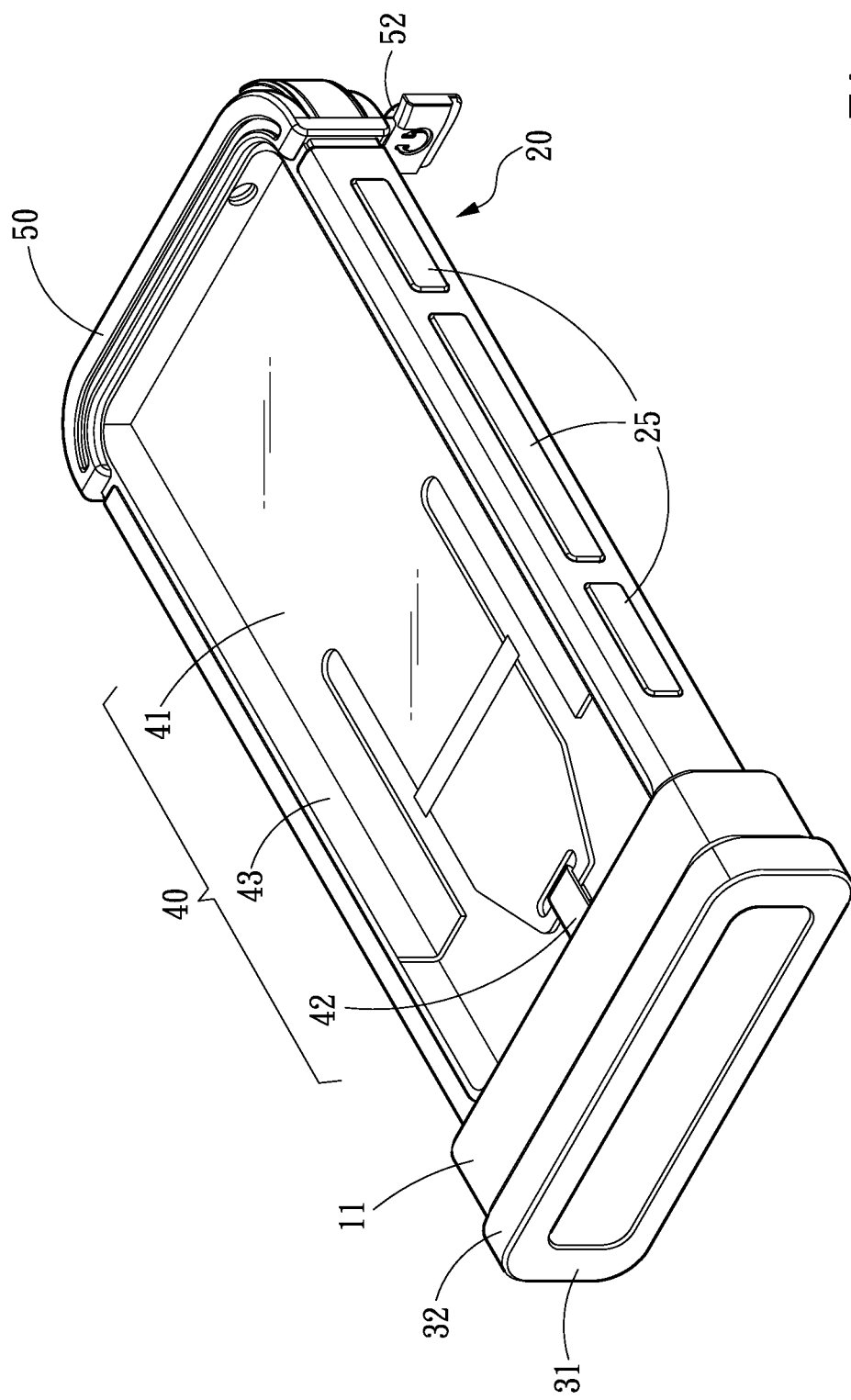
FIG. 2 is a perspective view of the invention.

Please refer to FIGS. 2 through 6, the present invention aims to provide a waterproof protection pouch for mobile devices 4. The mobile device 4 can be a smartphone, tablet computer or PDA. In this embodiment the mobile device 4 is a smartphone. The waterproof protection pouch comprises a coupling set 10, a pouch 20, a sealing member 30, a retrieval tray 40 and a lower protection member 50. The coupling set 10 includes a rigid ring 11, an opening 12 running through the rigid ring 11 and a clamping ring 13 wedged in the rigid ring 11. The rigid ring 11 has an annular latch groove 111 formed on the outer circumference.

Figure 5:
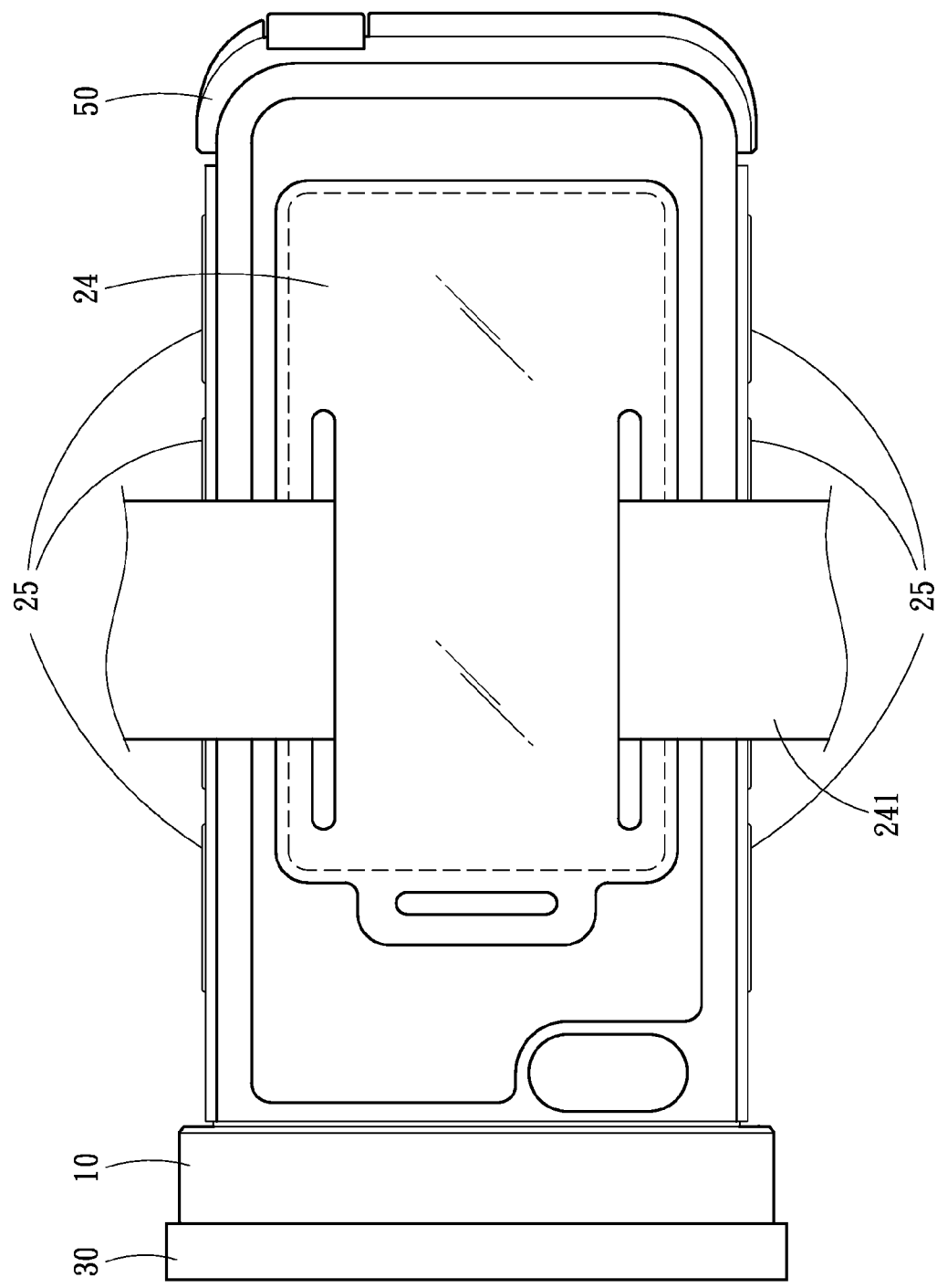
FIG. 5 is a rear view of the invention.

The pouch 20 includes a connecting portion 21 sandwiched between the rigid ring 11 and clamping ring 13, a pouch opening 22 formed in the connecting portion 21, a transparent viewing section 23, a fastening portion 24 at one side opposing to the transparent viewing section 23 and a plurality of protective air pads 25. The fastening portion 24 can be collaborated with and run through by a wearing element 241 when in use. The wearing element 241 can be a Velcro, a belt, a buckle or the like to allow a user to wear the waterproof protection pouch all the time to improve usability, as shown in FIG. 5. In addition, through the transparent viewing section 23, the user can do operation on the mobile device 4 while it is held in the waterproof protection pouch. The protective air pads 25 provide desired tactile feel when the user presses the buttons of the mobile device 4 in use, and also allow the waterproof protection pouch to provide an additional layer of protection.

Figure 4:
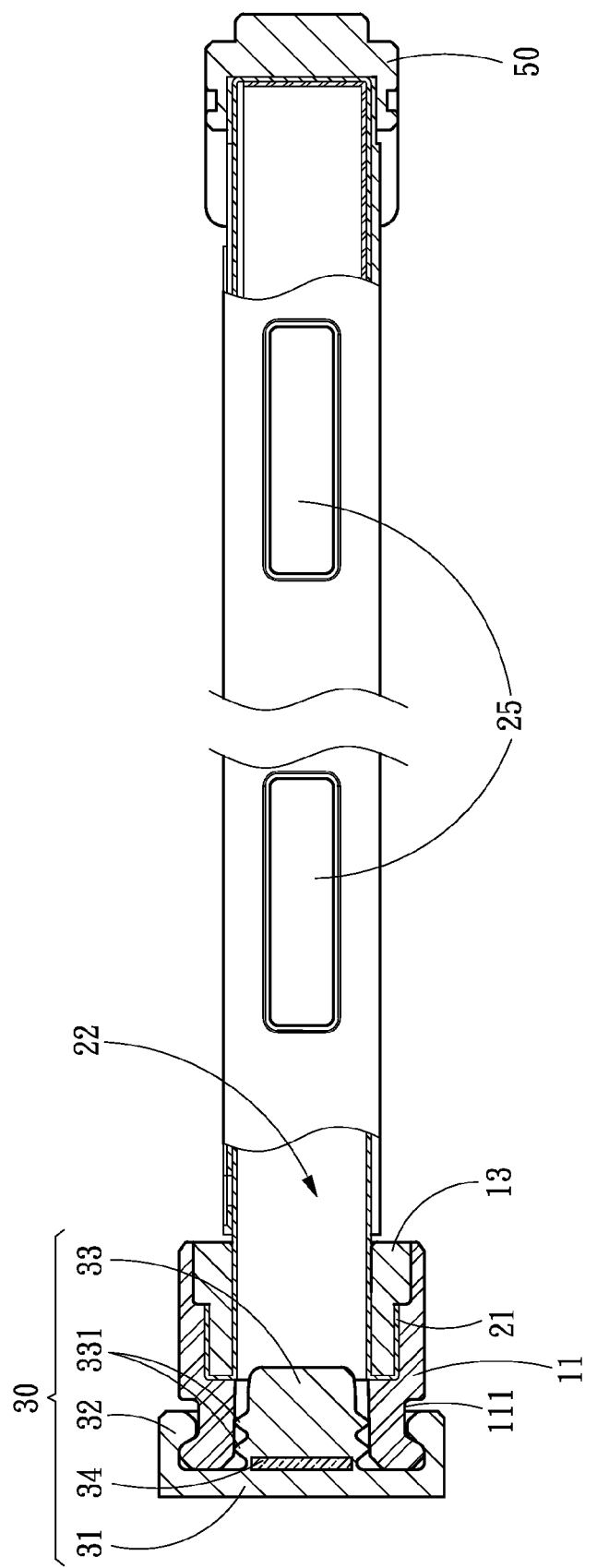
FIG. 4 is a sectional view of the invention.

The sealing member 30 includes a cap 31, a latch portion 32 located on the circumference of the cap 31 to latch on the latch groove 111, a plug 33 to wedge in the opening 12 for closing thereof, and a reinforced plate 34 interposed between the cap 31 and plug 33 as shown in FIG. 4. The plug 33 includes at least one annular sealing ridge 331 on the circumference thereof. More specifically, the coupling set 10 is made of rigid material such as metal or rigid plastics. The sealing member 30 is made of flexible material such as silicone, rubber or flexible plastics. When the sealing member 30 is latched on the coupling set 10 the latch portion 32 latches on the latch groove 111, therefore the sealing member 30 can be prevented from loosening away from the coupling set 10. Moreover, with the sealing member 30 having the characteristics of the flexible material, the plug 33 is deformed to fill with the opening 12 after being wedged in the opening 12 of the coupling set 10, thus provides effective waterproof function. In addition, the sealing ridge 331 can further enhance waterproof efficacy. Furthermore, through the reinforced plate 34, not only the cap 31 has a greater strength, wedging or removing the sealing member 30 against the coupling set 10 also can be done easier.

Figure 3:
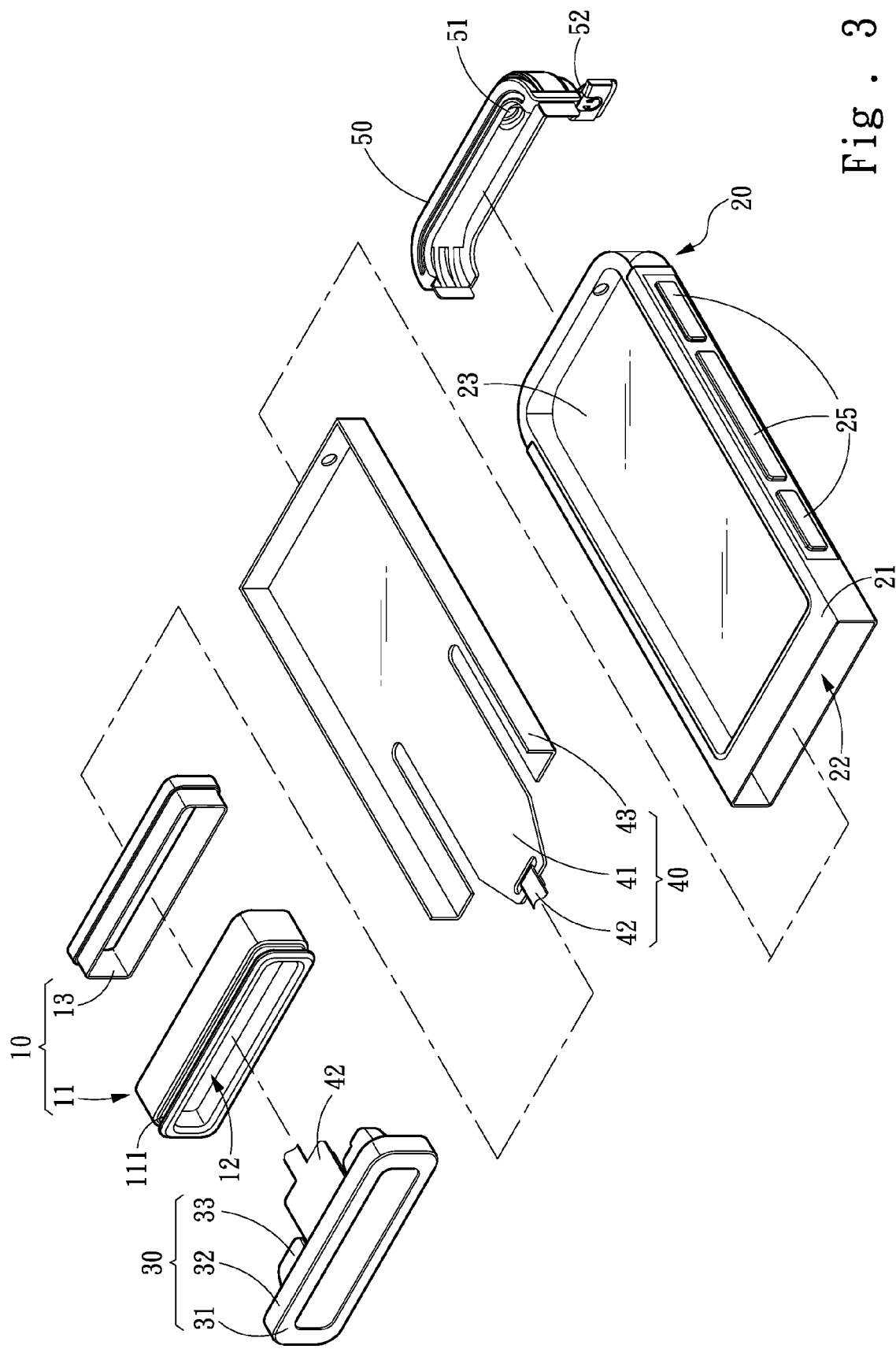
FIG. 3 is an exploded view of the invention.
Figure 6:
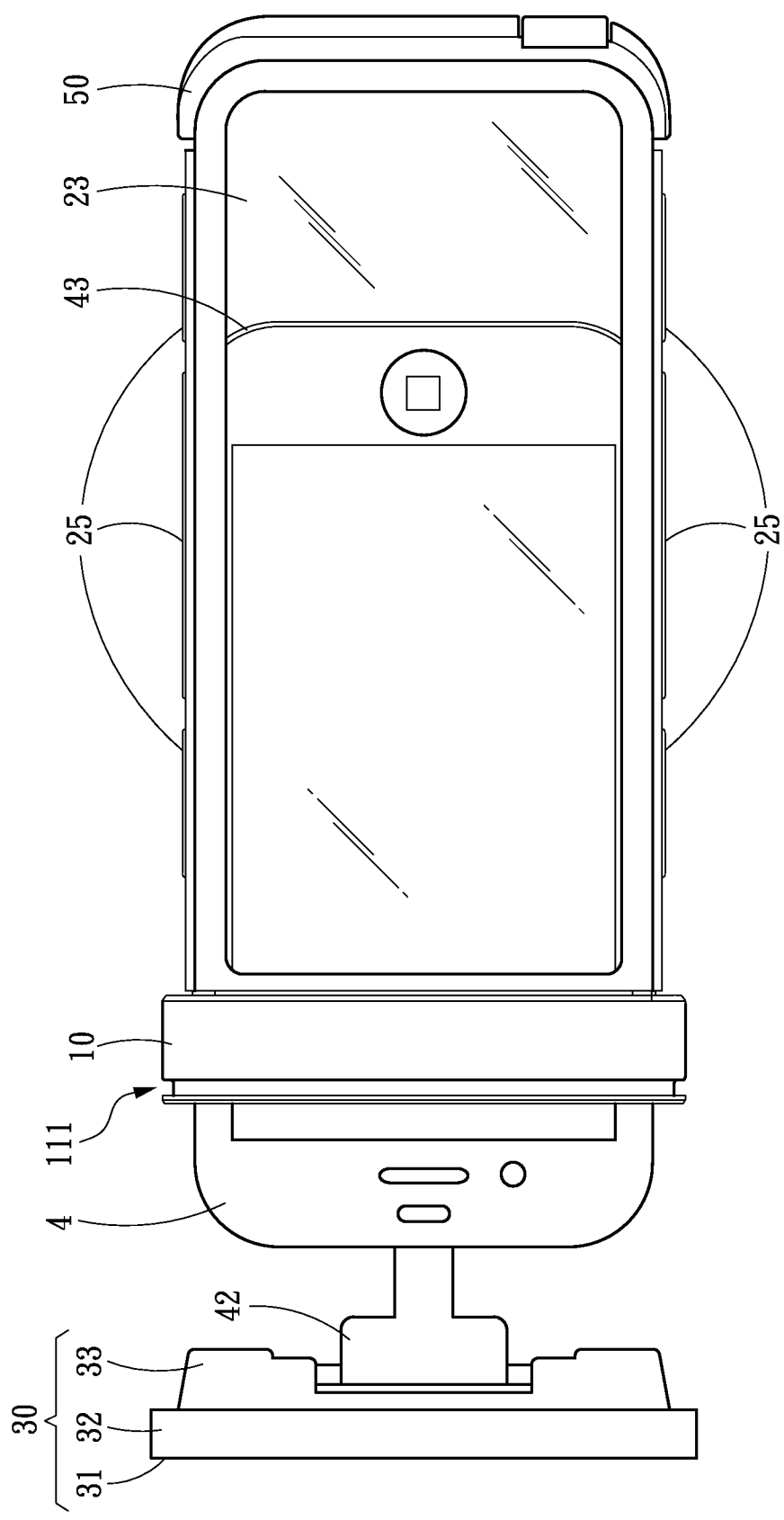
FIG. 6 is a schematic view of the invention in a use condition.

Please also refer to FIGS. 3 and 6, the retrieval tray 40 is located in the pouch 20 and includes a carrying plate 41, a retrieval portion 42 running through the pouch opening 22 and opening 12 to connect to the sealing member 30, and a positioning plate 43 on the circumference of the carrying plate 41. When the mobile device 4 is held in the waterproof protection pouch, it is rested on the carrying plate 41 and positioned via the positioning plate 43, thereby the mobile device 4 is prevented from sliding without affecting user's operation when in use. On the other hand, as the retrieval tray 40 is connected to the sealing member 30 via the retrieval portion 42, when the user wants to take out the mobile device 4 from the waterproof protection pouch, user merely needs to remove the sealing member 30, and then the retrieval tray 40 and the mobile device 4 rested on the carrying plate 41 can be pulled out at the same time, hence loading and unloading of the mobile device 4 can be accomplished simply and easily. In addition, the rigid positioning plate 43 can also withstand the pressure of external forces to provide further protection of the mobile device 4.

Finally, referring to FIG. 3, the invention also provides the lower protection member 50 located at one side of the pouch 20 remote from the coupling set 10. The lower protection member 50 includes an earphone jack 51 and a jack cork 52 insertable into the earphone jack 51. The earphone jack 51 can be inserted by an earphone as desired by the user when in use, and can be sealed by the cork 52 to maintain waterproof effect when the earphone is not in use.

As a conclusion, the invention provides features as follows:

1. By plugging the flexible sealing member in the rigid coupling set, the waterproof protection pouch can provide desired watertight effect.

2. Through the rigid ring, protective air pads, positioning plate and lower protection member, the waterproof protection pouch can withstand external pressure or impact when falling down, and thereby can provide crashproof and pressure-withstanding effects.

3. Since the retrieval portion is connected to the sealing member, when the sealing member is removed from the coupling set, the retrieval tray together with the mobile device also are pulled out, and therefore can improve usability.

4. The pouch is connected to the coupling set by clamping, hence can further enhance waterproof effect of the waterproof protection pouch.

5. The lower protection member is equipped with an earphone jack and a mating jack cork, and hence the waterproof protection pouch can be used with an earphone, and also can maintain watertight effect when the earphone is not in use.

What is claimed is:

1. A waterproof protection pouch for mobile devices, comprising:
    a coupling set including a rigid ring, an opening running through the rigid ring and a clamping ring wedged in the rigid ring, the rigid ring including an annular latch groove on an outer circumference thereof;
    a pouch including a connecting portion connected to the coupling set, a pouch opening formed in the connecting portion and a transparent viewing section, the connecting portion being sandwiched between the rigid ring and the clamping ring;
    a sealing member including a cap, a latch portion extended from the circumference of the cap toward the coupling set to latch on the latch groove and a plug wedged in the opening for closing thereof, the plug including at least one annular sealing ridge on an outer circumference thereof; and
    a retrieval tray including a carrying plate for holding a mobile device and a retrieval portion running through the pouch opening and the opening to connect to the sealing member.

2. The waterproof protection pouch of claim 1, wherein the mobile device is selected from the group consisting of a smartphone, a tablet computer and a personal digital assistant (PDA).

3. The waterproof protection pouch of claim 1, wherein the coupling set is made of metal or rigid plastics, and the sealing member is made of silicone or flexible plastics.

4. The waterproof protection pouch of claim 1, wherein the pouch includes a fastening portion at one side opposing to the transparent viewing section.

5. The waterproof protection pouch of claim 1, wherein the pouch further includes a plurality of protective air pads at two sides thereof.

6. The waterproof protection pouch of claim 1, wherein the retrieval tray further includes a positioning plate on the circumference of the carrying plate.

7. The waterproof protection pouch of claim 1, wherein the sealing member further includes a reinforced plate interposed between the cap and the plug.

8. The waterproof protection pouch of claim 1 further including a lower protection member located at one side of the pouch remote from the coupling set.

9. The waterproof protection pouch of claim 8, wherein the lower protection member further includes an earphone jack and a jack cork.

* * * * *